United States Patent
Douthitt et al.

(10) Patent No.: US 10,284,652 B2
(45) Date of Patent: May 7, 2019

(54) SYSTEMS AND METHODS FOR PROVIDING NETWORK-BASED CONTENT TO AN IN-VEHICLE TELEMATICS SYSTEM

(75) Inventors: Brian L. Douthitt, Holland, MI (US); Mark L. Zeinstra, Holland, MI (US); David T. Dembinski, Muskegon, MI (US); Kaloyan Tenchov, Holland, MI (US)

(73) Assignee: VISTEON GLOBALTECHNOLOGIES, INC., Van Buren Township, MI (US)

( * ) Notice: Subject to any disclaimer, the term of this patent is extended or adjusted under 35 U.S.C. 154(b) by 827 days.

(21) Appl. No.: 14/232,592

(22) PCT Filed: Sep. 17, 2011

(86) PCT No.: PCT/US2011/052057
§ 371 (c)(1),
(2), (4) Date: Jan. 13, 2014

(87) PCT Pub. No.: WO2013/009334
PCT Pub. Date: Jan. 17, 2013

(65) Prior Publication Data
US 2014/0164579 A1    Jun. 12, 2014

Related U.S. Application Data

(60) Provisional application No. 61/507,905, filed on Jul. 14, 2011.

(51) Int. Cl.
*H04L 29/08* (2006.01)
*G07C 5/00* (2006.01)
(Continued)

(52) U.S. Cl.
CPC .............. *H04L 67/12* (2013.01); *G07C 5/008* (2013.01); *H04L 67/025* (2013.01);
(Continued)

(58) Field of Classification Search
None
See application file for complete search history.

(56) References Cited

U.S. PATENT DOCUMENTS

| | | | |
|---|---|---|---|
| 6,047,327 A | 4/2000 | Tso | |
| 7,383,983 B2* | 6/2008 | Gaumond | H04N 21/41407 |
| | | | 235/375 |

(Continued)

FOREIGN PATENT DOCUMENTS

| | | |
|---|---|---|
| JP | 2003-115889 A | 4/2003 |
| JP | 2005-309750 A | 11/2005 |

(Continued)

OTHER PUBLICATIONS

Office Action dated Jun. 2, 2015, received in corresponding Japanese Application No. 2014-520174 and English translation, 13 pages.

(Continued)

*Primary Examiner* — Esther B. Henderson
(74) *Attorney, Agent, or Firm* — Dickinson Wright PLLC

(57) ABSTRACT

A method for providing network-based content to an in-vehicle telematics system is shown and described. The method includes include establishing a communications link between communications electronics of the vehicle telematics system and a remote content management server in communication with a plurality of remote content providers. The method further includes using the communications link to communicate with the remote content management server using an application programming interface. The processing electronics receives content from the plurality of remote content providers via the application programming interface. The communication between the remote content management server and at least one of the plurality of remote content providers is conducted according to a protocol for (Continued)

which the vehicle telematics system does not have an interface.

18 Claims, 11 Drawing Sheets

(51) Int. Cl.
*H04W 4/04* (2009.01)
*H04W 4/50* (2018.01)
*H04W 4/60* (2018.01)
*H04M 3/42* (2006.01)

(52) U.S. Cl.
CPC ......... *H04L 67/1097* (2013.01); *H04W 4/046* (2013.01); *H04W 4/50* (2018.02); *H04W 4/60* (2018.02); *H04M 3/42136* (2013.01)

(56) References Cited

U.S. PATENT DOCUMENTS

| | | | |
|---|---|---|---|
| 2006/0047373 A1* | 3/2006 | Sumcad | G07C 5/008 701/1 |
| 2006/0259580 A1 | 11/2006 | Laberteaux et al. | |
| 2007/0010922 A1 | 1/2007 | Buckley | |
| 2007/0094366 A1* | 4/2007 | Ayoub | H04L 29/06027 709/223 |
| 2008/0059510 A1* | 3/2008 | Cardamore | G06F 17/30053 |
| 2008/0155597 A1 | 6/2008 | Turgeman | |
| 2009/0075624 A1* | 3/2009 | Cox | H04B 1/205 455/345 |
| 2009/0233572 A1* | 9/2009 | Basir | H04M 3/5116 455/404.1 |
| 2009/0300139 A1 | 12/2009 | Shoemaker | |
| 2010/0280905 A1* | 11/2010 | Rothschild | G06Q 30/02 705/14.63 |
| 2010/0280932 A1* | 11/2010 | Jensen | G06Q 30/04 709/219 |
| 2012/0259951 A1* | 10/2012 | Schalk | G07C 5/008 709/217 |

FOREIGN PATENT DOCUMENTS

| | | |
|---|---|---|
| JP | 2006-293816 A | 10/2006 |
| JP | 2008-513860 A | 5/2008 |
| WO | WO 2008/091727 A1 | 7/2008 |

OTHER PUBLICATIONS

Search Report dated Feb. 20, 2015, received in European application No. 11 869 502.2, 6 pages.
International Search Report dated Feb. 1, 2012, as received in corresponding International Patent Application No. PCT/US2011/052057.
Office Action dated Jun. 3, 2015, in corresponding Chinese application No. 201180073359.6 and English translation, 11 pages.
Decision of Grant dated Jun. 14, 2016, received in corresponding Japanese Application No. 2014-520174, 3 pages.
Office Action dated Apr. 26, 2016, received in corresponding Chinese Application No. 201180073359.6 and English translation, 5 pages.
Office Action dated Oct. 31, 2016, received in corresponding Chinese application No. 201180073359.6 (3 pages) and English translation (1 page).
Examination Report dated Jun. 1, 2017, received in corresponding European application No. 11 869 502.2, 6 pages.

* cited by examiner

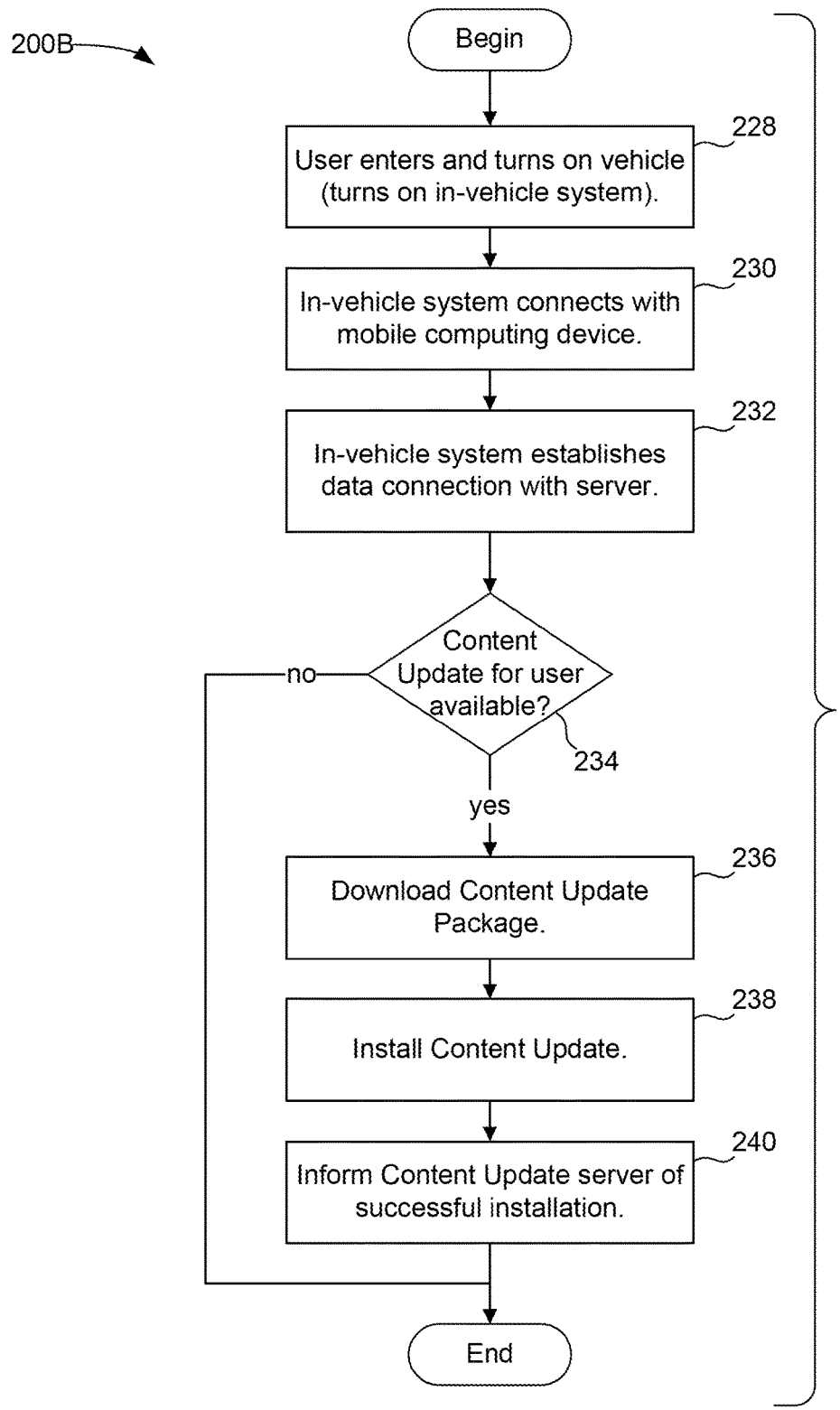

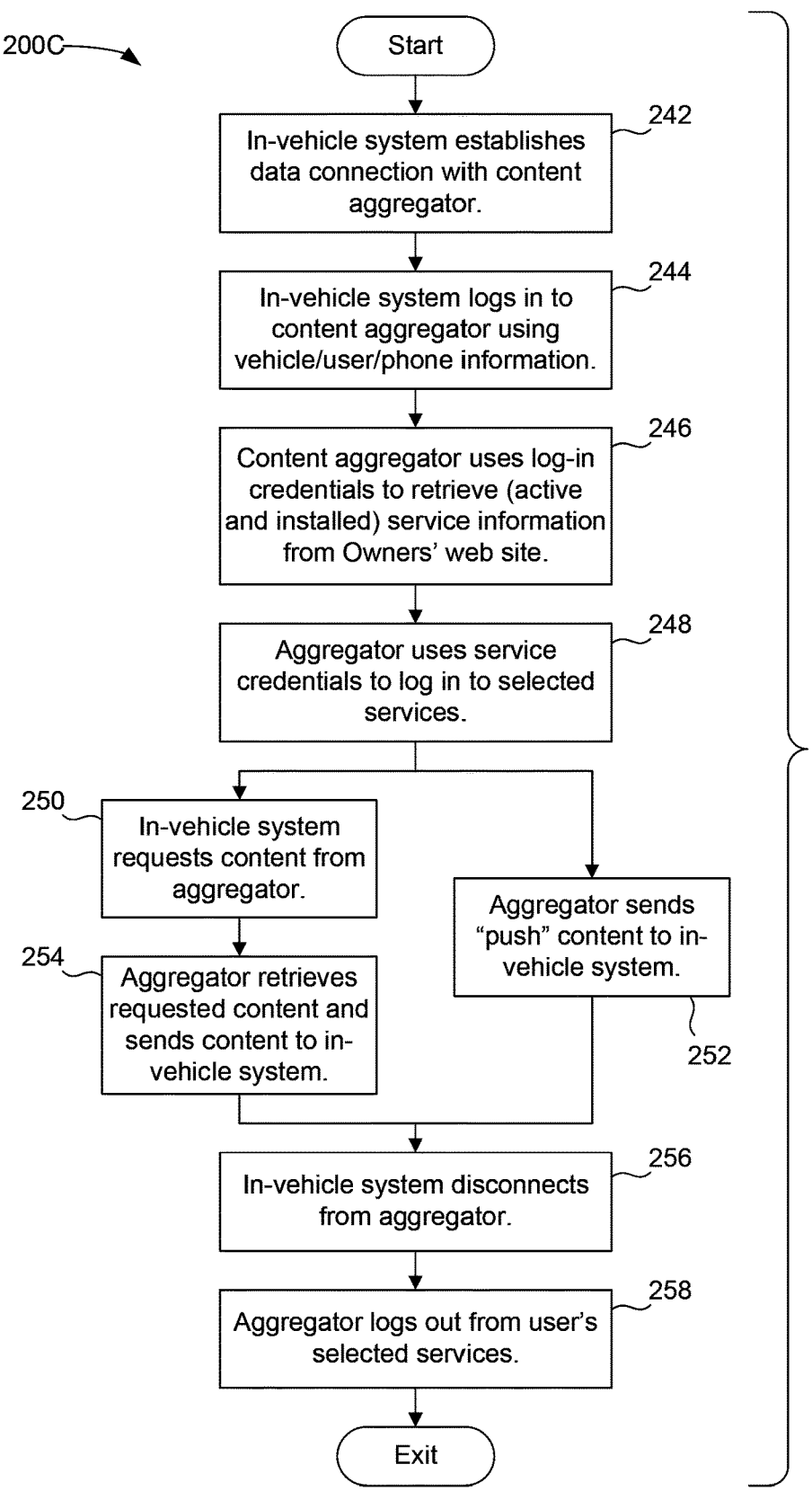

SYSTEMS AND METHODS FOR PROVIDING NETWORK-BASED CONTENT TO AN IN-VEHICLE TELEMATICS SYSTEM

CROSS REFERENCES TO RELATED APPLICATIONS

The present application is a U.S. National Stage of International Application No. PCT/US2011/052057, filed Sep. 17, 2011, which claims the benefit of U.S. Provisional Application No. 61/507,905, filed Jul. 14, 2011, the entire disclosures of all of which are incorporated herein by reference.

BACKGROUND

The present disclosure relates generally to systems and methods for providing network-based content to in-vehicle telematics.

Some vehicle telematics systems (e.g., navigation systems, telephone-integrated systems, informatics systems, entertainment systems, infotainment systems, connectivity systems, etc.) include the capability of connecting (e.g., via wireless or wired communication) to portable electronic devices (e.g., mobile phones, personal digital assistants, etc.) brought into the vehicle. Some vehicle telematics systems may receive information or services from remote sources (e.g., satellite sources, radio sources, Wi-Fi sources, etc.). The received information or services may include navigation information, point of interest information, traffic information, weather information, entertainment information, Internet radio information and services, or other content. Conventional systems having such connectivity features are typically unable to add, remove, or update telematics features without visiting a dealer or running 'update' software from a local CDROM or thumb drive.

SUMMARY

In one embodiment of the invention, for example, a system includes a remote content management system for communicating with a plurality of remote content providers according to disparate protocols of the remote content providers. The system also includes a vehicle telematics system having communications electronics and an application programming interface for communicating with the remote content management system. The vehicle telematics electronics are configured to receive content from the plurality of remote content providers via the application programming interface without having interfaces for communicating according to the disparate protocols of the remote content providers.

In another exemplary embodiment of the invention, a vehicle telematics system is configured for operation with a remote content management server in communication with a plurality of remote content providers. The vehicle telematics system includes communications electronics for establishing a communications link with the remote content management server. The vehicle telematics electronics further includes processing electronics for using the communications link to communicate with the remote content management server using an application programming interface. The processing electronics receive content from the plurality of remote content providers via the application programming interface.

In another embodiment of the invention, a computerized method for operation by a vehicle telematics system includes establishing a communications link between communications electronics of the vehicle telematics system and a remote content management server in communication with a plurality of remote content providers. The method further includes using the communications link to communicate with the remote content management server using an application programming interface. The processing electronics receives content from the plurality of remote content providers via the application programming interface. The communication between the remote content management server and at least one of the plurality of remote content providers is conducted according to a protocol for which the vehicle telematics system does not have an interface.

In another embodiment of the invention, a remote content management system for communicating information from a plurality of remote content providers to a vehicle telematics system includes processing electronics. The processing electronics have a first set of programming interfaces for communicating with the plurality of remote content providers according to disparate protocols of the remote content providers. The processing electronics also have a second set of programming interfaces for communicating with the vehicle telematics system. The processing electronics are configured to provide for communications between the vehicle telematics system and the remote content providers using the first set of programming interfaces and the second set of programming interfaces.

BRIEF DESCRIPTION OF THE DRAWINGS

FIG. 2B is a flow diagram of a method of updating available entertainment/information/radio sources of a vehicle by downloading information from a remote content management server of the present application, according to an exemplary embodiment.

FIG. 2C is a flow diagram of a method of receiving content (e.g., audio, video, graphics, information content, etc.) from a remote content provider via a remote content management server at a vehicle, according to a described embodiment.

DETAILED DESCRIPTION

Referring generally to the Figures, exemplary systems and methods for providing network-based content to in-vehicle telematics system are shown and described. The systems and methods interact with network or "cloud"-based computing servers in order to manage a vehicle telematics system (e.g., to manage the system software, to manage content, to extend the user interface, etc.). The systems and methods described herein advantageously accommodate changes in network content or network service providers in a manner that is consistent with the vehicle telematics system's existing human machine interface (HMI). The systems and methods described herein can advantageously add network content or a network service provider without significantly updating the software of the vehicle telematics system or adding a new stand-alone application to the vehicle telematics system. The systems and methods described herein connect to a network or cloud-based computing service to dynamically add a network service using standardized application protocols between the vehicle telematics electronics and the network or cloud-based computing service.

Figure 1A:
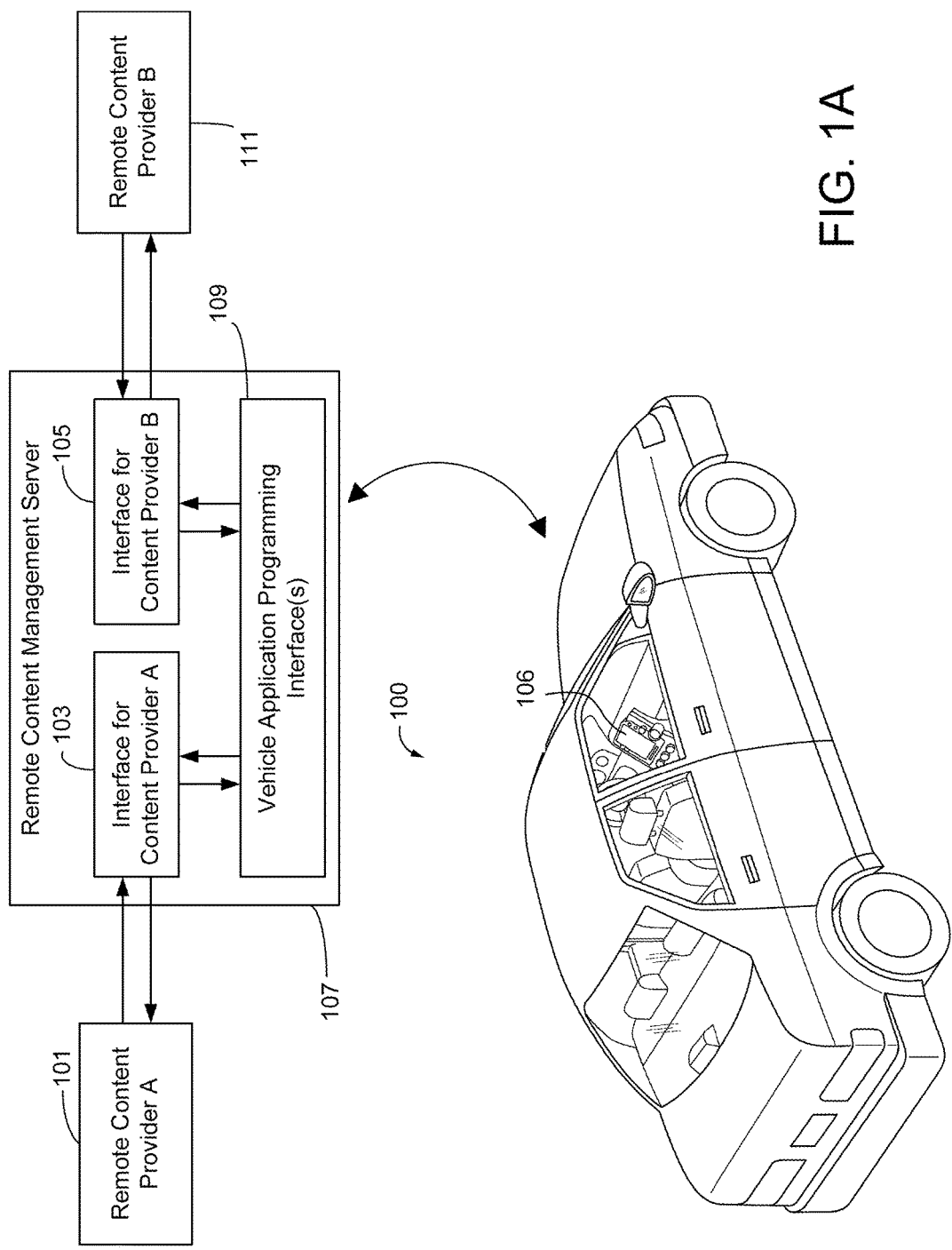
FIG. 1A is a block diagram of a system for providing content to vehicle electronics from remote content providers via a remote content management server, according to a described embodiment. The vehicle may not be preconfigured to communicate with the remote content providers. Rather, the remote content management server may facilitate the communication and interaction between the vehicle electronics and the remote content providers.
Figure 1B:
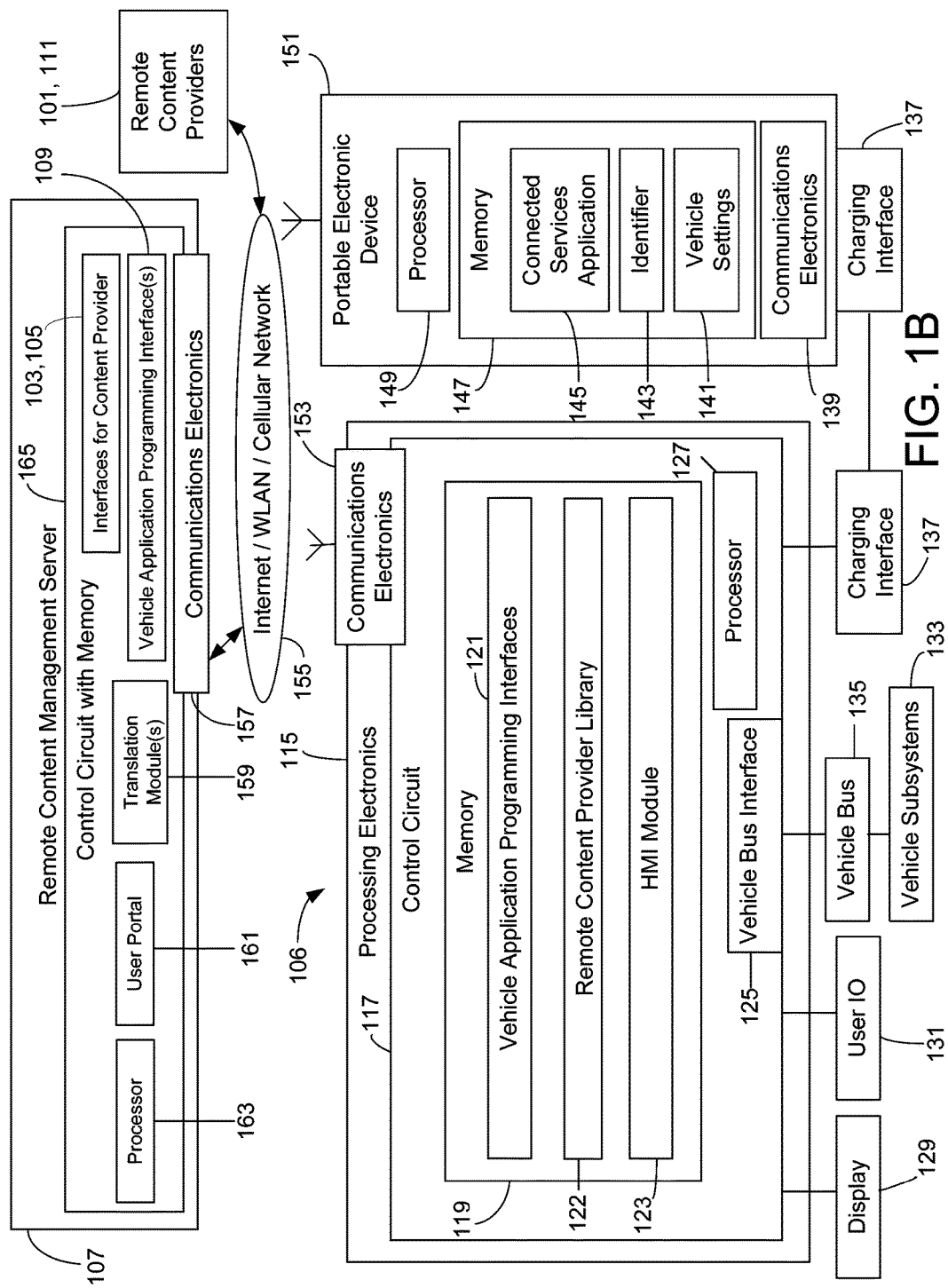
FIG. 1B is a more detailed block diagram of the system of FIG. 1A, according to a described embodiment.

Referring now to FIGS. 1A and 1B, embodiments of the disclosure relate to a vehicle telematics system 106 for a vehicle 100 (e.g., automobile, motorcycle, boat, truck, etc.). The telematics system includes any number of displays (e.g., LCD displays, touch screen displays, etc.), and any number of user interface elements (e.g., buttons, switches, touch screen elements for selection, dials, joysticks, steering-wheel mounted controls, microphones, etc.). The telematics system 106 may include communications features (e.g., BLUETOOTH® phone connectivity, garage door communications systems such as HOMELINK® sold by Johnson Controls, etc.), user comfort and convenience features, safety features, entertainment features such as radio, or other user interfacing features. When the term vehicle telematics is used in this disclosure, it can mean any vehicle electronics configured to communicate telematics information to a user of the vehicle or to receive telematics information from the user. For example, a vehicle telematics system 106 can include a heads-up display, a cluster display, a cluster control, center stack displays and other electronics, or other related or distributed telematics controls.

While the vehicle telematics system 106 of FIGS. 1A and 1B is shown as a relatively integrated system (e.g., many of the functional modules are stored in the same memory), in other embodiments, the vehicle telematics system 106 may be more distributed. In yet other embodiments, the vehicle telematics system 106 may be considered a part of a vehicle navigation system or a stand-alone device (e.g., an aftermarket vehicle add-on) that provides inputs and outputs to vehicle systems such as the vehicle navigation system, the vehicle HVAC system, the vehicle radio system, and the like. The terms "vehicle telematics system", "in-vehicle telematics system" and "in-vehicle system" are used interchangeably within this disclosure. All such architecture and combinations thereof are within the scope of this disclosure. Claims may be presented in this or a subsequent application to narrow the invention to any one embodiment or set of embodiments.

As shown in FIG. 1A, a remote content management server 107 is in communication with plurality of remote content providers. The remote content management server 107 includes a first interface 103 for communicating with content provider A 101 and a second interface 105 for communicating with content provider B 111. The remote content management server 107 uses provider-specific applications protocols (i.e., application programming interfaces specific to the content provider) to communicate with the remote content providers. Examples of remote content providers include Facebook, Twitter, Pandora, Slacker, and iHeartRadio. Other remote content providers may include music providers, social networking providers, navigation information providers, weather information providers, Internet radio providers, business news providers, entertainment news providers, and providers of any other type of information content. As remote content providers become more or less popular, or as a driver's tastes and preferences change, a driver may desire for the vehicle telematics system 106 to operate with new remote content providers. Rather than reprogramming the vehicle telematics system 106 to communicate according to a specific application protocol of the new remote content provider, the vehicle telematics system 106 communicates with the remote content management server 107 according to the pre-established vehicle application programming interface. The vehicle application programming interface 109 may include shared methods or other protocols for communication (e.g., attributes, objects, commands, timing schemes, etc.) between the vehicle telematics system and the remote content management server. Using the vehicle application programming interface 109, the remote content management server 107 can provide information from remote content providers to the vehicle telematics system 106. Further, using the vehicle application programming interface 109, the remote content management server 107 can receive commands or information from the vehicle telematics system 106 and provide them to the appropriate remote content provider (e.g., via an interface for communicating with the remote content provider). In an exemplary embodiment, the vehicle application programming interface 109 may provide the name, type, and dependencies of content or services from the remote content providers. The vehicle application programming interface 109 may provide this information via XML. The vehicle telematics system 106 (e.g., a corresponding vehicle API module thereof) can parse the information to determine or verify whether it can satisfy the dependencies (for example, a dependency may include support for Bluetooth streaming audio using A2DP). The vehicle telematics system can extend its HMI (e.g., adding Pandora or another remote content provider to a list of options) based on the information received from the remote content management server 107.

Referring now to the more detailed block diagram shown in FIG. 1B, the vehicle telematics system 106 is shown to include communications electronics 153. The communications electronics 153 can be a BLUETOOTH transceiver configured to communicate via short-range wireless radio frequency communications to a mobile phone or other portable electronic device 151 carried or placed within the vehicle cabin. In other embodiments, the communications electronics 153 can be of any other wired or wireless technology or protocol. For example, the communications electronics 153 may be a Wi-Fi® transceiver configured to communicate with an access point and thereby avoiding the need to connect to remote sources (i.e., Internet sources) via a portable electronic device 151. The vehicle telematics system 106 may communicate with the portable electronic device 151 via the Wi-Fi transceiver (e.g., via a 'tethered' connection and data plan). By way of further example, the communications electronics 153 may be or include an embedded cellular transceiver (e.g., 3G, 4G, LTE), or a port (USB) that supports any number of plug-in transceivers. Using such communications electronics 153, the vehicle telematics system 106 may connect to a cellular data network 155 and the Internet without making use of a mobile phone or a nearby Wi-Fi router or access point. The portable electronic device 151 can connect to a cellular tower or other remote communications station to effect voice or data communications with outside systems (e.g., a telephone network, the Internet, etc.). In some embodiments, the communications electronics 153 and 139 between the vehicle telematics electronics 115 and the portable electronic device 151 may be wired interfaces (e.g., USB, optical digital, etc.). The vehicle telematics system 106 may communicate with an external network 155 (e.g., the Internet, a wireless router or access point connected to another network or networks, a WLAN, a WAN, a cellular network, etc.) directly via its communications electronics 153 or may use its communications electronics 153 to connect to a portable electronic device 151 (e.g., mobile phone) having connections with such an external network 155.

The vehicle telematics system 106 is shown to include processing electronics 115 including or coupled to a vehicle bus interface 125 for communicating with a vehicle bus 135. The vehicle bus interface 125 can be or include any number of jacks, wire terminals, wire leads, ports, plugs, receptacles or other structures for connecting a wire or wires of the vehicle bus 135 to the vehicle telephone device. The vehicle bus interface 125 can also include circuitry (e.g., filters, converters, decoders, etc.) for sending and/or receiving communications to/from the vehicle bus 135. The vehicle bus 135 may be a CAN bus, a LIN bus, a MOST bus, an Ethernet bus, or another type of vehicle bus. The vehicle bus 135 communicably couples one or more vehicle subsystems 133 (e.g., body control modules, ignition subsystems, security systems, engine control units, etc.) to the vehicle telematics electronics 115. In the same or other embodiments, the vehicle telematics electronics 115 may also or alternatively include direct connections or non-vehicle bus communications connections to one or more of the vehicle subsystems 133.

In FIG. 1B, the processing electronics 115 are further shown as coupled to a display 129 and a user input/output (IO) device or devices 131. As shown in FIG. 1A, the display 129 can be a flat panel display (e.g., LCD) installed within a center console location. As also shown in FIG. 1A, the user IO device 131 can be or include any number of buttons, dials, or the like surrounding or nearby the display. As mentioned above with respect to FIG. 1A, the user IO 131 of FIG. 1B may be or include a microphone, a touchscreen, a voice recognition circuit, or other suitable user input/output devices.

The control circuit 117 and/or other portions of the processing electronics 115 may be embedded within the vehicle 100 (e.g., behind a trim panel) or for otherwise mounted in the vehicle 100. The control circuit 117 and/or other portions of the processing electronics 115 may be one or more printed circuit boards, point-to-point wirings of electronic components, a flexible circuit, another type of circuit, or a combination thereof. The control circuit 117 of FIG. 1B includes a processor 127 and memory 119. The processor 127 can be implemented as a general purpose processor, an application specific integrated circuit (ASIC), one or more field programmable gate arrays (FPGAs), a group of processing components, or other suitable electronic processing components. The memory 119 is one or more devices (e.g., RAM, ROM, flash memory, hard disk storage, etc.) for storing data and/or computer code for completing and/or facilitating the various processes or steps described in the present disclosure. Memory 119 may be or include volatile memory or non-volatile memory. Memory 119 may include database components, object code components, script components, or any other type of information structure for supporting the various activities and information structures described in the present disclosure. According to another embodiment, memory 119 is communicably connected to the processor 127 for the control circuit 117 and includes computer code for executing (e.g., by the processor and/or by the control circuit, etc.) one or more processes described herein. In the embodiment of FIG. 1B, for example, the portable device setting module is a computer code module for execution by the processor to provide the phone setting logic described herein.

In addition to the vehicle telematics system 106, the remote content management server 107 and the remote content providers 101, 111 are connected for communication to the external network 155 (e.g., Internet, WLAN, cellular network). Information from the remote content providers 101, 111 is provided to the vehicle telematics system 106 via the remote content management server 107. The remote content management server 107 includes a control circuit with memory 165. The control circuit with memory 165 includes at least one processor 163. The interfaces for the content provider 103, 105 may be or include an up-to-date API for communication with the remote content provider 101, 111. As the remote content provider 101, 111 upgrades or otherwise changes its API, advantageously, an API may not need to be updated in the vehicle telematics system 106. Rather, only the interface for the content provider 103, 105 in the remote content management server 107 may require updating (or significant updating). The remote content management server 107 may include more than one vehicle application programming interface 109 for different vehicles or versions of vehicle telematics systems 106. Accordingly, a 2013 model year vehicle may have a first vehicle application programming interface in the remote content management server 107 while a 2014 model year vehicle may have a second vehicle application programming interface in the remote content management server 107. One or more translation modules 159 may be included in the remote content management server 107 for facilitating translations between information, methods, commands, or other communications for the remote content providers 101, 111 and information, methods, commands, or other communications for the vehicle telematics system 106. The translation modules 159 may include one or more executables, schema maps, relational databases, or other resources for coordinating communication between the two types of interfaces of the remote content management server 107.

The remote content management server 107 is further shown to include a user portal 161. The user portal 161 may be a web server, web service or other portal for accepting user log-ins. The user portal 161 allows a user to view his or her remote content provider preferences. Using the user portal 161, for example, the user can associate his or her vehicle ID or vehicle telematics system 106 ID with credentials for the varying remote content providers 101, 111. Further, using the user portal 161, a user can turn on or off features of the remote content providers 101, 111, remove remote content providers 101, 111 from resources available in the vehicle 100, add new remote content providers 101, 111 (e.g., for which the remote content management server 107 has recently added support via a new application programming interface 109), configure settings associated with the remote content providers, or conduct other changes to the system. The user portal may be accessed from the vehicle telematics electronics 115 (e.g., only when the vehicle is in park or stopped), the portable electronic device 151, or any other web client.

Memory 119 of the vehicle telematics system 106 is shown to include vehicle application programming interfaces 121. This vehicle application programming interface 121 may match one or more APIs 109 of the remote content management server 107 for facilitating communication between the remote content management server 107 and the vehicle telematics electronics 115. The vehicle telematics electronics 115 are further shown to include a remote content provider library 122. The remote content provider library 122 can store information regarding the remote content provider 101, 111 necessary for integrating the remote content provider's feature with the vehicle telematics system's human machine interfaces. For example, the remote content provider library 122 may retain a list of available Internet radio services available from remote content providers 101, 111. The HMI module 123 of the vehicle telematics system 106 may parse the list to provide an audible or visual menu of available Internet radio sources to the user. When a user selects one of the available sources, the HMI module 123 may use other information in the remote content provider library 122 to determine how to invoke a service of the remote content provider 101, 111 and/or how to integrate data from the remote content provider 101, 111 into a standardized user interface experience (i.e., theme) of the HMI 123. The remote content provider library 122 may be retained in non-volatile memory across vehicle power cycles such that only new remote content provider information is transmitted on a regular basis and so that lists of remote content providers 101, 111 are immediately available to the user upon start-up. The remote content management server 107 may provide push notifications to the vehicle telematics system 106 when new remote content providers 101, 111 are available or upon receiving notifications that updates or new information are available for reception or installation.

As shown in FIG. 1B, the portable electronic device 151 can include a connected services application 145. The connected services application 145 can access the content and services of the remote content management server 107 and provide the same to the vehicle telematics system 106. In some embodiments, the connected services application 145 provides both stream and message-based communications between the portable electronic device 151 and the remote content management server 107. In some embodiments, the connected services application 145 provides buffering to provide playback from the remote content management server 107. This may include any amount of pre-buffering that is needed. Accordingly, in an alternative embodiment, the connected services application 145 of the portable electronic device 151 can act as a proxy for the vehicle telematics system 106. Such an architecture may advantageously allow the portable electronic device 151 to handle all communications external of the vehicle 100 and to only pass highly coordinated information between the portable electronic device 151 and the vehicle telematics system 106. Connected services application 145, identifier 143, vehicle settings 141 can be stored in a memory device 147 of the portable electronic device 151. The memory device 147 may be similar to the memory device 119 of control circuit 117. Communications electronics 139 may be a BLUETOOTH transceiver or another wired or wireless communications device or devices for communicating with vehicle communications electronics 153 and/or a remote content management server 107 (e.g., via a cellular network, internet, WLAN 155, etc.).

Regardless of whether the portable electronic device 151 is used for a communication pass-through or a proxy device for communications with the remote content management server 107, the identifier 143 of the portable electronic device 151 may be used to change remote content settings for different users. For example, if a first portable electronic device 151 were identified as connected via Bluetooth, the vehicle 100 may activate a first set of Internet radio stations. On the other hand, if a second portable electronic device were identified via Bluetooth, the vehicle telematics system 106 may activate a second set of Internet radio stations. For this purpose the portable electronic device 151 may be a key fob in addition to a mobile phone or personal digital assistant. The vehicle telematics system 106 may use the phone number, the ESN, the IMEI, a Bluetooth address or another vehicle identifier 143 to identify a particular portable electronic device 151 or user. Vehicle settings 141 can be stored in memory 147 and include, for example, transmission settings, streaming settings, automatic connectivity settings, configuration information for communicating with the vehicle electronics, or other settings for facilitating portable electronic device 151's role in the system of FIG. 1B. Each of processing electronics 115 and portable electronic device 151 may be coupled to or have a respective charging interface 137 for charging the portable electronic device 151.

The HMI provided by the vehicle telematics system 106 may be provided in varying ways according to varying embodiments. For example, the HMI may be based on icons, where all of the functionality associated with the content/service is contained within its own structure. In other embodiments, the HMI may be based on context where the functionality of content/service is distributed throughout the HMI structure. For example, in a contextual HMI, personal information from a variety of sources may be consolidated under one user interface (e.g., an Internet radio interface) rather than being separated (e.g., a separate interface for Pandora, a separate interface for iHeartRadio, etc.).

In an exemplary embodiment, when the vehicle telematics system 106 is not connected or cannot reliably connect to network-based content and services (directly or via a connected portable electronic device), the HMI may reflect only the objects/content/sources within the vehicle such as the radio, CD player, and embedded navigation system. Network-based content (e.g., location-based traffic and weather, Internet radio) are disabled until an appropriate connection is available.

In the event that entirely new classes of content become available for which the vehicle telematics system 106 was not designed, the remote content management server 107 may identify a dependency for the content that the vehicle telematics system 106 cannot satisfy. If a software system update were available to fulfill the dependency, the remote content management server 107 may notify the vehicle telematics system 106 of the update. The vehicle telematics system 106 may download the update (after user confirmation), install it, and then reboot for it to take effect. The vehicle telematics system 106 would prompt the user of the available software update and inform the user as the update progresses. Downloading and installing such software updates could be performed using software and protocols described as "mobile device management", but is not limited specifically to Open Mobile Alliance (OMA) Device Management (DM) or Firmware Over-the-Air (FOTA) update.

In an alternative embodiment, the portable electronic device itself includes all of the functionality of the above-described remote content management server 107. In other words, a software application of the portable electronic device includes interfaces for communicating with the remote content providers as well as a programming interface 109 for communicating with the vehicle telematics electronics 115. Such a portable electronic device 151 can aggregate content for the HMI of the vehicle telematics electronics 115. When the portable electronic device 151 is connected for communication to the vehicle telematics electronics 115, the portable electronic device 151 can transfer metadata and other information the vehicle telematics system 106 can use to make use of the remote content providers available to the portable electronic device 151. Data from the remote content providers 101, 111 can be requested by the portable electronic device 151 and provided to the vehicle telematics electronics 115 via, e.g., the API 109 between the portable electronic device 151 and the vehicle telematics electronics 115.

Referring to FIGS. 2A-2D, a flow diagram of methods in accordance with described embodiments are shown. Methods 200A-200D are provided by way of example, as there are a number of ways to carry out the systems and methods of the present disclosure. Method 200A-200D, shown in FIGS. 2A-2D respectively, may be implemented by a computer, a computer program, a client, a server, a client-server relationship, etc. Method 200A-200D are described herein as carried out by the systems of FIG. 1A-1B by way of example.

Figure 2A:
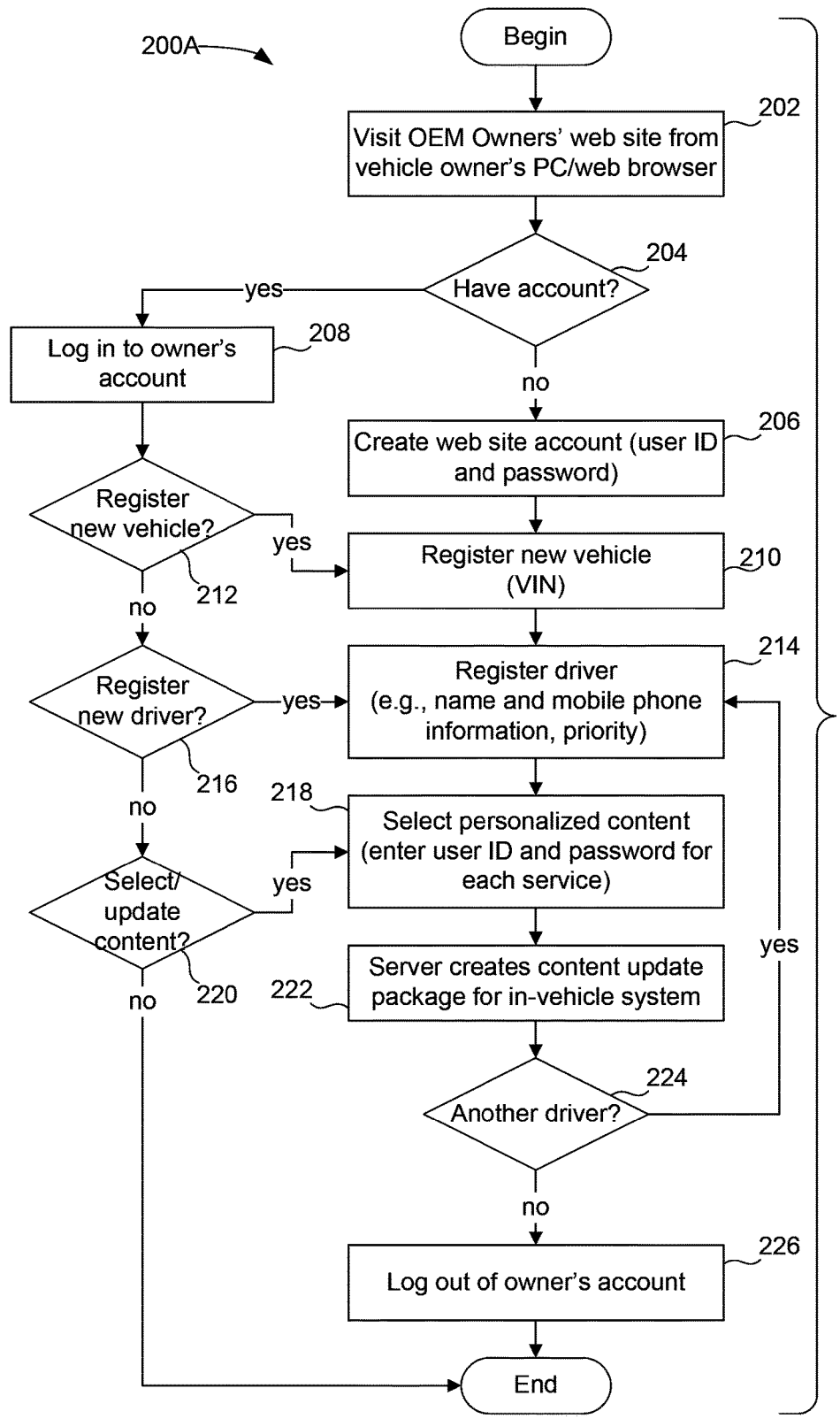
FIG. 2A is a flow diagram of a method of process for a remote content management server or portal thereof, the process for stepping a user through selecting remote content providers for adding to the vehicle and preparing content update packages for the vehicle, according to a described embodiment.

Referring to FIG. 2A, a flow diagram of a process 200A for configuring a user or vehicle account using a remote content management server (e.g., of FIG. 1A, 1B) is shown, according to an exemplary embodiment. The process 200A of FIG. 2A may include visiting an OEM owners' website (e.g., a portal for the remote content management server) (step 202). The portal may use a graphical user interface to ask the user whether the user has an account (step 204). If the user does not have an account, the remote content management server or the portal may walk the user through the process of creating a web site or remote content management server account (e.g., establishing a user ID and password (step 206). If the user has an account, the remote content management server can step through a process of logging into the vehicle owner's account (step 208). If the existing user needs to register a new vehicle (a check occurs at step 212) or if a new user has just logged in, then a new vehicle can be registered (at step 210) with the remote content management system. Vehicle registration may occur by storing a VIN at the remote content server that will be transmitted to the remote content server when the vehicle electronics are logged into the remote content server. If the existing user would like to register a new user (a check occurs at step 216) or if a new user is continuing on the site, then a new driver will be registered (step 214). Registration may occur by or end with the remote content server or owners' portal storing name information, mobile phone information, priority information (e.g., which phone should be given priority if two phones are brought into a vehicle), or other information. The portal or remote content management server may prompt the user for whether a service of the remote content management server should be selected or updated (prompt and check at step 220). If a user indicates that he or she would like to select or update content, then the portal or remote management server may present graphical user interfaces to the user for allowing the user to select personalized content (step 218). For example, step 218 may include showing a plurality of possible sources (e.g., Facebook, iHeartRadio, Pandora, etc.) to the user for use with the vehicle electronics. In response to a selection of any particular source, the user may be prompted to enter user ID and password information. At step 222, the remote content management server can create a content update package for providing to the in-vehicle system (e.g., for downloading at a next power-up of the vehicle). The update package may include graphics, connection information such as IP addresses, streaming settings, bitrates, subscription information, or any other information that the vehicle will later need to stream information from a remote content provider via the remote management server. If another driver will be added (the portal can prompt the user and check at step 224) then a new driver can be registered and step through the personalization process. For example, after a first driver adds his internet radio sources, a second driver may register and set her radio sources. The server-created content update package may include a unique menu of remote content providers and settings for each user. The portal may log the user out at step 226.

Referring to FIG. 2B, a flow diagram of a method of updating content in accordance with a described embodiment is shown. In some embodiments, the user has selected service data through a website, remote source, etc. In some embodiments, the user may pair/bond a portable electronic device 151 with an in-vehicle system 106. After the example method 200B, begins, the user turns on the in-vehicle system 106 at step 228. In some embodiments, the user may turn the ignition to begin the in-vehicle system 106. However, the user may use auditory, visual, or tactile methods to begin the in-vehicle system 106, e.g., voice-activation, touch-screen activation, etc. At step 230, the in-vehicle system 106 connects with the portable electronic device 151. At step 232, the in-vehicle system 106 establishes a data connection with the remote content management server 107. In some embodiments, the remote content management server 107 may be a cloud-based server. The data connection may be established via Wi-Fi, USB 3G modem, 4G, embedded cellular, transceiver, Bluetooth, dial-up networking, phone-based data Gateway, etc. via network 155. At step 234, an update may be available. The available update may be downloaded by the in-vehicle system 106 in step 236. In some embodiments, the update may be ignored, saved, stored, deleted, etc. Alternatively, the user may exit the application update process if no update is available. The downloaded update may be installed in step 238. The installation may take place immediately upon download. In some embodiments, the installation may be delayed, saved, stored, etc. At step 240, the remote content management server 107 receives a notification that the installation has been successful.

Referring to FIG. 2C, a flow diagram of a method of receiving content in accordance with a described embodiment is shown. In some embodiments, the user may select service data through a website. In some embodiments, the user may pair/bond a portable electronic device 151 with an in-vehicle system 106. In some embodiments, other methods may have occurred, such as method 200B. After method 200C begins, at step 242, the in-vehicle system 106 establishes a data connection with the content aggregator. The content aggregator may be a remote content management server 107. In some embodiments, the server may be a cloud-based content aggregator. The data connection may be established via Wi-Fi, USB 3G modem, 4G, embedded cellular, transceiver, Bluetooth, dial-up networking, phone-based data Gateway, etc. via network 155. At step 244, the in-vehicle system 106 may log in to an aggregator. In some embodiments, the aggregator may collect content from the in-vehicle system 106, the portable electronic device 151, etc. At step 246, the aggregator (e.g., a user portal of or in communication with the aggregator) uses log-in credentials (e.g., iHeartRadio username and password) to retrieve service data from the content provider (e.g., iHeartRadio). For example, the aggregator may retrieve service data from remote content provider 101 or 111. In some embodiments, the service data is installed at the aggregator without retrieval from a remote content provider 101 or 111. For example, at the aggregator or an interface thereof (e.g., web interface), a manual configuration process may be conducted to install the service data in the aggregator for a new service. At step 248, the aggregator uses the service data to access selected services. The in-vehicle system 106 may request content from the aggregator at step 250. The aggregator may receive the request and provide content to the in-vehicle system 106 at step 254. The aggregator may provide content to the in-vehicle system 106 at step 252 without a request for content (e.g., if the remote content provider is configured to push notifications or messages to the aggregator). At step 256, the in-vehicle system 106 disconnects from the aggregator. The aggregator may log out from the selected services at step 258 (e.g., because the aggregator has receives a message that the vehicle has been turned off).

Figure 2D:
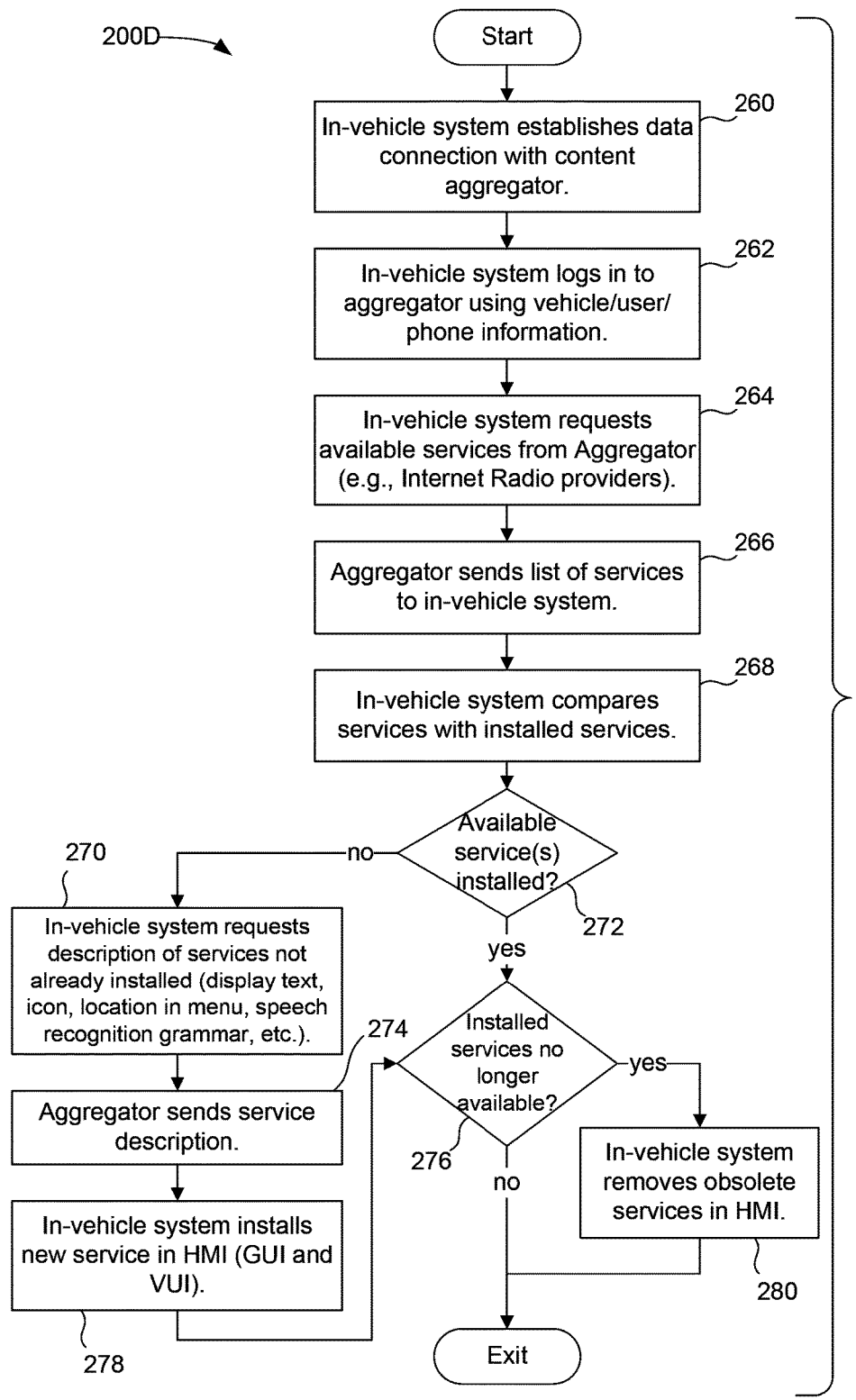
FIG. 2D is a flow diagram of a method for managing remote content providers using a vehicle and an accompanying remote content management server or aggregator, according to a described embodiment.

Referring to FIG. 2D, a flow diagram of a method of installing content in accordance with a described embodiment is shown. In some embodiments, the user may select service data through a website. In some embodiments, the user may pair/bond a portable electronic device 151 with an in-vehicle system 106. In some embodiments, other methods may have occurred, such as method 200B, 200C, etc. After method 200D begins, at step 260, the in-vehicle system 106 establishes a data connection with the content aggregator. The aggregator may be a remote content management server 107. In some embodiments, the server may be a cloud-based content aggregator. The data connection may be established via Wi-Fi, USB 3G modem, 4G, embedded cellular, transceiver, Bluetooth, dial-up networking, phone-based data Gateway, etc. via network 155. At step 262, the in-vehicle system 106 may log in to an aggregator using vehicle, user, and/or phone information. In some embodiments, the aggregator may collect content from the in-vehicle system 106, the portable electronic device 151, etc. At step 264, the in-vehicle system 106 requests available services from the aggregator. At step 266, the aggregator provides service data (e.g., regarding available Internet Radio Providers, Video Providers, etc.) to the in-vehicle system 106. The service data may be represented in Extensible Markup Language (XML), JavaScript Object Notation (JSON), or any other machine/human-readable language.

At step 268, the in-vehicle system 106 compares the received service data with installed service data. A determination is made regarding the installation status of available service data. At step 270, the in-vehicle system 106 requests description of service data not installed, which may be, for example, display text, icons, menu locations, speech/voice recognition, grammar, etc. The aggregator transmits a description of the service data at step 274. The in-vehicle system 106 may install service data in the human-machine interface (HMI). The HMI may be a graphical user interface (GUI), a voice user interface (VUI), or other interface. At step 276, the in-vehicle system 106 determines whether the service previously installed is no longer available, and, therefore, should be removed from the in-vehicle system. If the service is no longer available/supported, then the in-vehicle system 106 removes the service data from the HMI at step 280.

Figure 3A:
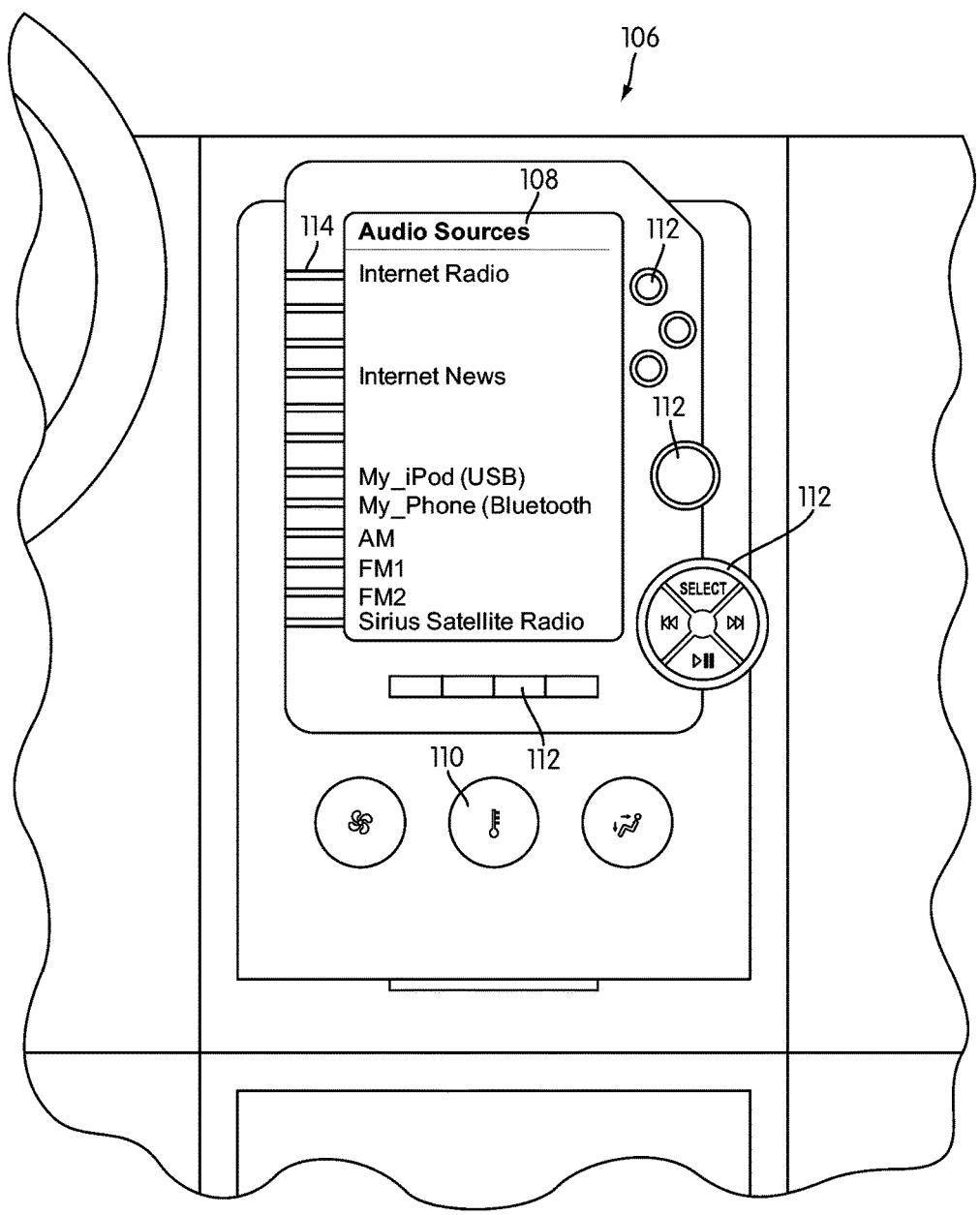
FIG. 3A illustrates a graphical user interface of the vehicle control system of FIGS. 1A and 1B, according to a described embodiment.

Referring to FIG. 3A-3E, an interface is illustrated in accordance with described embodiments. The interfaces may provide data to the in-vehicle system, including, but not limited to, graphic, textual, audio, etc. In some embodiments, the interfaces may include mark-up languages, including, but not limited to, hypertext markup language (HTML), XML JavaScript Object Notation (JSON), or any other machine/human-readable language Referring to FIG. 3A, a graphical user interface is illustrated according to a described embodiment. In-vehicle system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g. LCD, DLP, plasma, CRT), configuration (e.g. portrait or landscape), or shape (e.g. polygonal, curved, curvilinear). Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, or (iv) to control any other desired vehicle function. Pushbuttons 114 typically allow for the selection and display of various functions of in-vehicle control system 106 including HVAC system control, sound system control, hands-free phone use, contact or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allows the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit and/or dial one or more entries containing personal contact information, by use of a tactile or oral command. The operation of pushbutton 114 for calendar management may display a menu screen or execute commands that allow the user to view, list, select, sort, search for, edit and/or create one or more entries containing personal schedule information by tactile or oral command. The operation of pushbutton 114 for vehicle log management may display a menu screen or execute commands that allow the user to input, view, select and/or reset information related to vehicle operation (e.g. fuel economy, engine temperature, distance to empty, etc.) by tactile or oral command. In an implementation, the pushbutton 114 may include multiple pushbuttons to access audio sources, as shown in FIG. 3A. FIG. 3A illustrates a graphical user interface with the buttons include Internet Radio, Internet News, My_iPod (USB), My_Phone (Bluetooth), AM, FM1, FM2, and Sirius Satellite Radio.

Figure 3B:
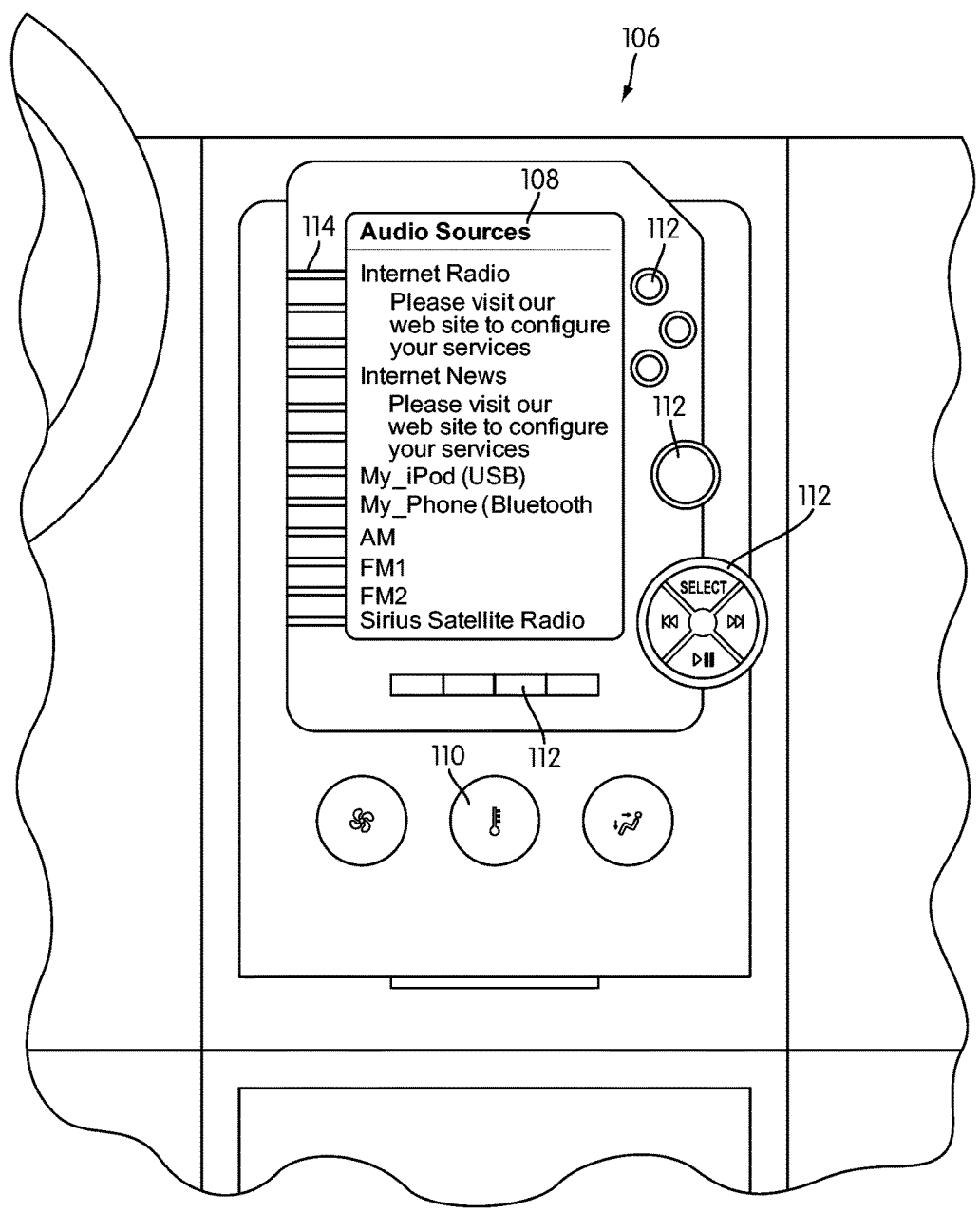
FIG. 3B illustrates another graphical user interface of the vehicle control system of FIGS. 1A and 1B, according to a described embodiment.

Referring to FIG. 3B, a graphical user interface in a configuration mode is shown. In some embodiments, the initial state of the GUI provides display data, as shown in FIG. 3B. The display data indicates that service data may be configured for various audio sources. For example, in FIG. 3B, the user is directed to configure Internet Radio and Internet News by viewing a website. In some embodiments, the GUI provides audio data to notify the user to configure the service data. In some embodiments, the in-vehicle system 106 may be directed to register data such as vehicle, user account, etc., as shown in FIG. 2A. In some embodiments, the in-vehicle system 106 may be directed to install services, using a number of methods, for example, as shown in FIG. 2C and FIG. 2D.

Figure 3C:
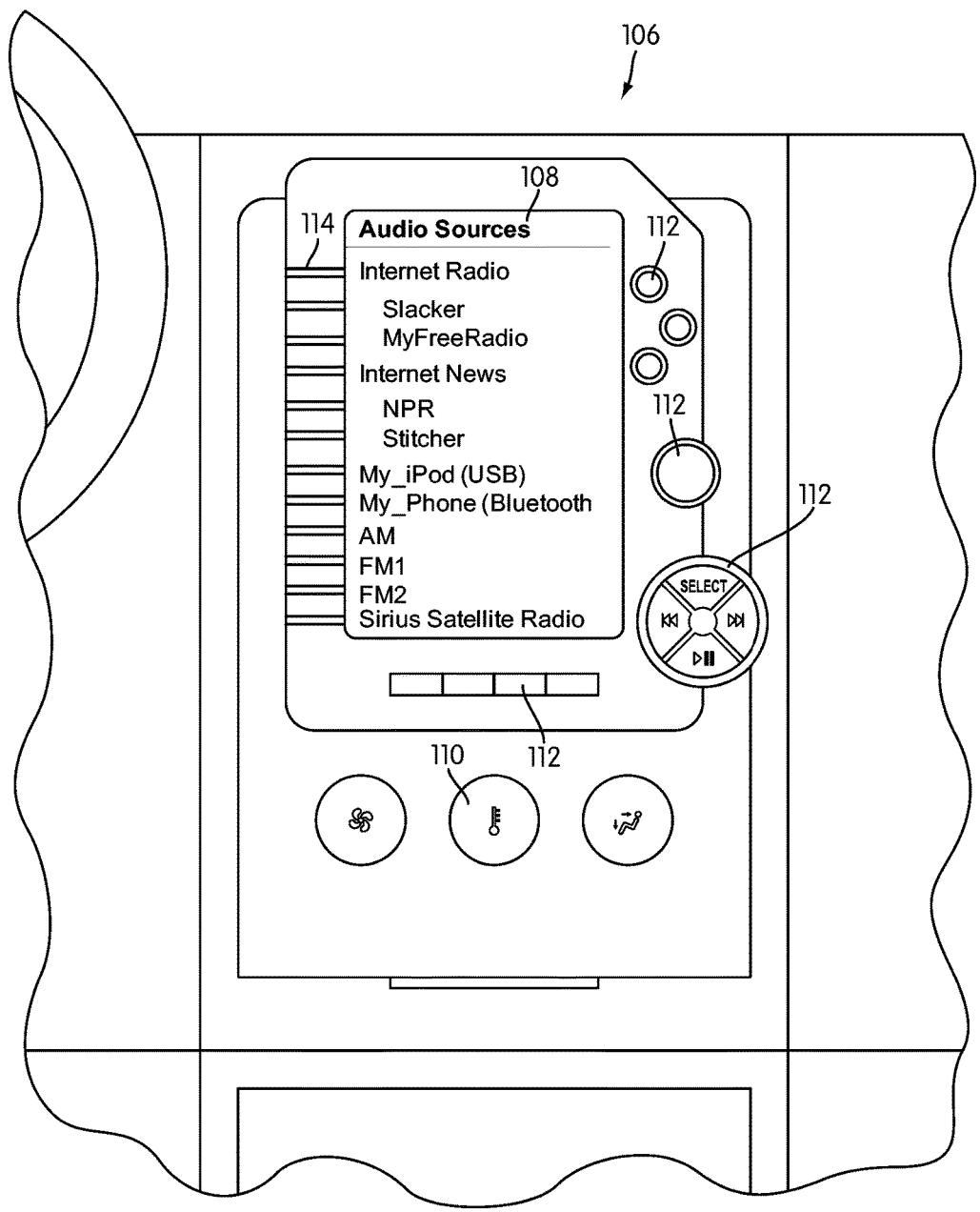
FIG. 3C illustrates another graphical user interface of the vehicle control system of FIGS. 1A and 1B, according to a described embodiment.

Referring to FIG. 3C, the graphical user interface is shown in a post-configuration mode. In some embodiments, the state of the GUI after initial user configuration is associated with selecting service data and providing log-in credentials. The in-vehicle system 106 may receive content, information, etc. from a remote content management server 107, as described above (e.g., FIGS. 2C and 2D). In some embodiments, the configured state of the GUI provides display data, as shown in FIG. 3C. The display data indicates that the various audio sources have been configured with service data from the website. For example, in FIG. 3C, Internet Radio was configured to display, access, and/or playback Slacker and MyFreeRadio, while Internet News was configured to display, access, and/or playback NPR and Stitcher. In some embodiments, the GUI provides audio data to notify the user that the service data has been configured.

Figure 3D:
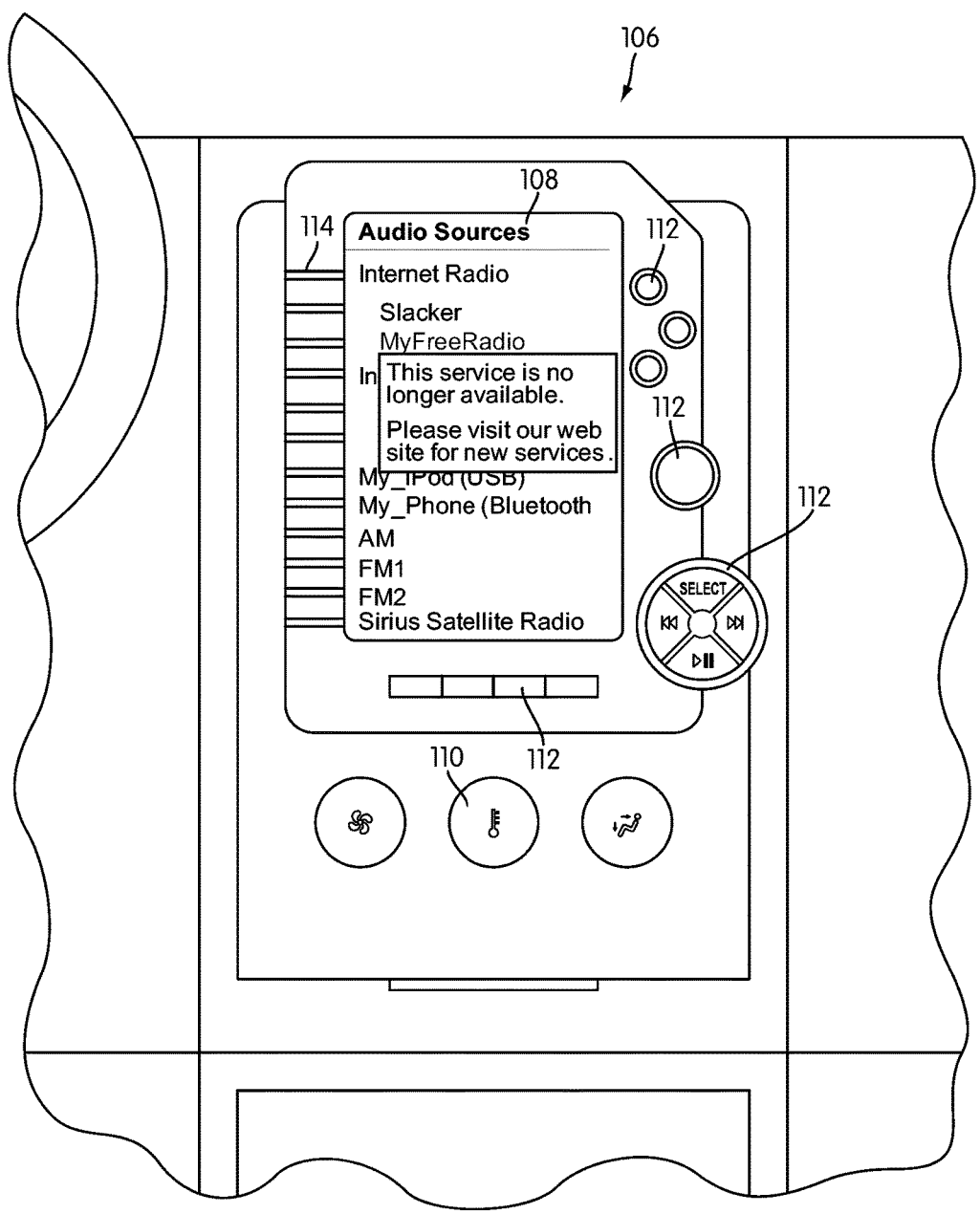
FIG. 3D illustrates another graphical user interface of the vehicle control system of FIGS. 1A and 1B, according to a described embodiment.

Referring to FIG. 3D, the GUI in an aggregator service data mode is shown. The configured state of the GUI in FIG. 3D illustrates grayed-out display data. The grayed-out display data indicates that MyFreeRadio can no longer be selected because it is no longer available/supported by the content aggregator. In some embodiments, the GUI provides audio data (e.g., playback of "please note that MyFreeRadio was discontinued") to notify the user that the service data is no longer available. In some embodiments, the in-vehicle system 106 is directed to visit the website for updated service data and, in response, generates a pop-up box indicating that the service is no longer available, as shown in FIG. 3D. The in-vehicle system 106 may be user instructed or directed (e.g., by the aggregator in an automated communications-driven process) to download a content update (e.g., if an update is available, as shown in FIG. 2B).

Figure 3E:
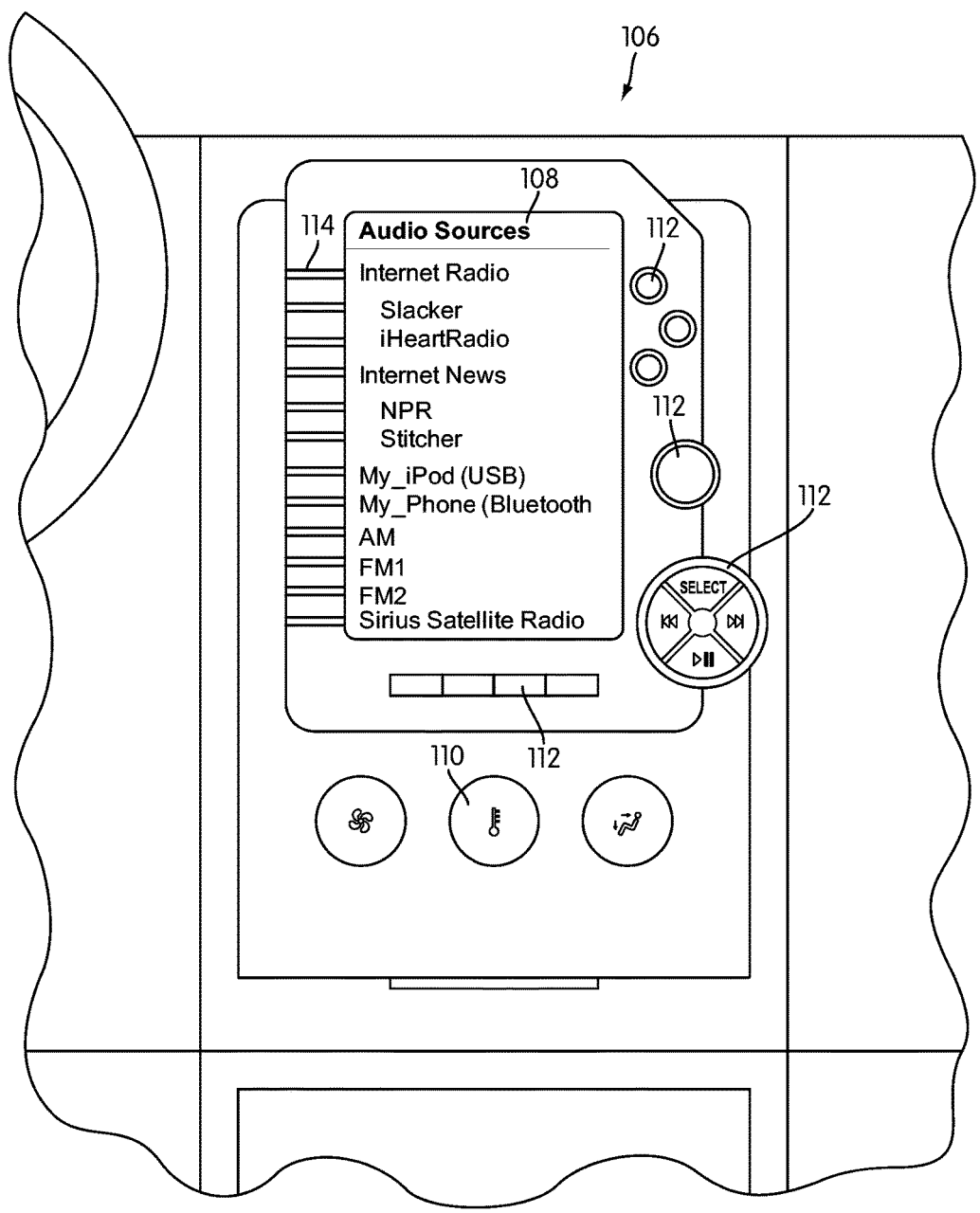
FIG. 3E illustrates another graphical user interface of the vehicle control system of FIGS. 1A and 1B, according to a described embodiment.

Referring to FIG. 3E, the GUI in a post-aggregator service data mode is shown. The configured state of the GUI provides display data. The display data indicates that the various audio sources have been configured with service data from the website. In some embodiments, the GUI provides audio data to notify the user that the audio sources have been configured with the service data from the website. For example, in FIG. 3E, Internet Radio was configured to display Slacker and iHeartRadio. MyFreeRadio was removed from the GUI, because of its status as obsolete service data. The in-vehicle system may request other descriptions of services not already installed, e.g., as shown in FIG. 2D.

The methods described herein may be computer-implemented methods and may be executed by one or more computer systems or electronic systems as described herein. Instructions for causing the computer systems to complete the activities of the above-described methods may be embodied on computer-readable media such as a CDROM, flash drive, or otherwise. All such embodiments of the invention are within the scope of the present disclosure. In some embodiments, the software modules described herein can be implemented using HTML with AJAX. In other embodiments, the software modules can be implemented using Java technologies.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present application is not limited to the details or methodology set forth in the description or illustrated in the figures. It should also be understood that the terminology is for the purpose of description only and should not be regarded as limiting.

What is claimed is:

1. A vehicle telematics system for operation with a remote content management server in communication with a plurality of remote content providers, comprising:
   a transceiver mounted in a vehicle, the transceiver configured to establish a communications link with the remote content management server; and
   a control circuit mounted in the vehicle, the control circuit comprising an application programming interface, the control circuit configured to use the communications link to communicate with the remote content management server using the application programming interface to transmit commands to the remote content management server for providing to an appropriate remote content provider of the plurality of remote content providers;
   wherein the control circuit receives content from the plurality of remote content providers via the application programming interface,
   wherein the application programming interface is a pre-established application programming interface, and the control circuit is configured to communicate with new remote content providers using the pre-established application programming interface for communicating with the remote content management server,
   wherein the control circuit is configured to receive metadata regarding the new remote content providers via the communications link, and
   wherein the control circuit adds options for utilizing the new remote content providers based on the metadata received via the communications link to a human machine interface provided to the user.

2. The vehicle telematics system of claim 1, wherein the plurality of remote content providers include application interfaces; and wherein the control circuit of the vehicle telematics system is not configured to communicate according to the application interfaces of the remote content providers.

3. The vehicle telematics system of claim 1, wherein the transceiver is configured to establish the communications link with the remote content management server using a direct wireless connection to an access point outside of the vehicle.

4. The vehicle telematics system of claim 1, wherein the transceiver is configured to establish the communications link with the remote content management server using a connection to a mobile phone.

5. A computerized method for operation by a vehicle telematics system, comprising:
   establishing a communications link between communications electronics of the vehicle telematics system and a remote content management server in communication with a plurality of remote content providers, the vehicle telematics system mounted in a vehicle; and
   using the communications link to communicate with the remote content management server using an application programming interface to transmit commands to the remote management server for providing to an appropriate remote content provider of the plurality of remote content providers;
   wherein processing electronics of the vehicle telematics system receives content from the plurality of remote content providers via the application programming interface;
   wherein the communication between the remote content management server and at least one of the plurality of remote content providers is conducted according to a protocol for which the vehicle telematics system does not have an interface,
   wherein the application programming interface is a pre-established application programming interface, and the communication electronics are configured to communicate with new remote content providers using the pre-established application programming interface for communicating with the remote content management server,
   wherein the processing electronics are configured to receive metadata regarding the new remote content providers via the communications link, and
   wherein the processing electronics add options for utilizing the new remote content providers based on the metadata received via the communications link to a human machine interface provided to the user.

6. A system, comprising:
   a remote content management system comprising a first control circuit configured to communicate with a plurality of remote content providers according to disparate protocols of the remote content providers;
   a vehicle telematics system mounted in a vehicle, the vehicle telematics system comprising a transceiver and a second control circuit, the second control circuit comprising a first application programming interface configured to communicate with the remote content management system; and
   a portable electronic device comprising a connected services application configured to access the remote content providers via a second application programming interface for communicating with the remote content management system;
   wherein the second control circuit is further configured to receive content from the plurality of remote content providers via the first application programming interface without having interfaces for communicating according to the disparate protocols of the remote content providers, and wherein the second control circuit is further configured to use the connected services application as a proxy or communication passthrough to transmit commands to the remote content management system, wherein the remote content management system is configured to provide the commands transmitted by the second control circuit to an appropriate remote content provider of the plurality of remote content providers,
   wherein the first application programming interface is a pre-established application programming interface, and the second control circuit is configured to communicate with new remote content providers using the pre-established application programming interface for communicating with the remote content management system,
   wherein the second control circuit is configured to receive metadata regarding the new remote content providers via a communications link, and wherein the second control circuit adds options for utilizing the new remote content providers based on the metadata received via the communications link to a human machine interface provided to the user.

7. The system of claim 6, wherein the remote content management system further comprises:
a configuration server that receives configuration information from a client for a user, wherein the configuration server allows the user to select and deselect remote content providers for access at the vehicle, and wherein the configuration server allows the user to input account information for each of a plurality of remote content providers.

8. The system of claim 7, wherein the configuration server is integrated with a server for the remote content management system.

9. The system of claim 7, wherein at least one of the vehicle telematics system and a portable electronic device include the client for providing the configuration information to the configuration server.

10. The system of claim 6, wherein the vehicle telematics system communicates with the remote content management system through the portable electronic device.

11. The system of claim 10, wherein the portable electronic device is configured to allow the user to continue access to the same remote content providers available via the vehicle telematics system via the portable electronic device and its connected services application.

12. The system of claim 10, wherein the portable electronic device is configured to receive data from the remote content management system and to reformat the data according to a different streaming protocol for reception by the vehicle telematics system.

13. The system of claim 12, wherein the different streaming protocol comprises a Bluetooth A2DP protocol and the data received at the portable electronic device from the remote content management system is received according to a TCP/IP protocol.

14. The system of claim 10, wherein the portable electronic device passes data from the remote content management system to the vehicle telematics system without changing the data to a different type of communications protocol.

15. The system of claim 14, wherein the data is passed from the remote content management system to the portable electronic device and from the portable electronic device to the vehicle telematics system according to a TCP/IP protocol.

16. The system of claim 6, wherein the vehicle telematics system is configured to allow a user to select from a mix of audio, video, or entertainment sources in the vehicle, wherein a first set of the sources comprises the remote content providers via the remote content management system and a second set of sources comprises sources not associated with the remote content management system.

17. The system of claim 16, wherein the vehicle telematics system does not use the remote content management system or the application programming interface for communicating with the remote content management system in communications with the second set of sources, and wherein the second control circuit comprises specialized application programming interfaces for communicating with each of the second set of sources.

18. A remote content management system comprising:
a control circuit configured to communicate information from a plurality of remote content providers to a telematics system mounted in a vehicle, the control circuit comprising:
a first set of programming interfaces for communicating with the plurality of remote content providers according to disparate protocols of the remote content providers; and
a second set of programming interfaces for communicating with the telematics system mounted in the vehicle;
wherein the control circuit is configured to provide for communications between the vehicle telematics system and the remote content providers using the first set of programming interfaces and the second set of programming interfaces to receive commands from the vehicle telematics system and provide the commands to an appropriate remote content provider of the plurality of remote content providers,
wherein the first set of programming interfaces are pre-established application programming interfaces, and the control circuit is configured to communicate with new remote content providers using the pre-established application programming interfaces for communicating with the remote content providers,
wherein the control circuit is configured to receive metadata regarding the new remote content providers via a communications link, and
wherein the control circuit adds options for utilizing the new remote content providers based on the metadata received via the communications link to a human machine interface provided to the user.

* * * * *